United States Patent
Borg

[19]

[11] Patent Number: 5,997,020

[45] Date of Patent: Dec. 7, 1999

[54] DRIVING DEVICE

[76] Inventor: Jonny Borg, Camomillgatan 2, 75447 Uppsala, Sweden

[21] Appl. No.: 08/958,624

[22] Filed: Oct. 27, 1997

Related U.S. Application Data

[63] Continuation-in-part of application No. PCT/SE96/00590, May 3, 1996.

[30] Foreign Application Priority Data

May 3, 1995 [SE] Sweden ................................ 95016333

[51] Int. Cl.$^6$ ...................................................... B62M 1/16
[52] U.S. Cl. .......................... 280/243; 280/244; 280/246
[58] Field of Search ................................ 280/242.1, 244, 280/246, 253, 255, 243, 251

[56] References Cited

U.S. PATENT DOCUMENTS

| | | |
|---|---|---|
| 2,732,221 | 1/1956 | Welch . |
| 4,189,166 | 2/1980 | Lindsey ................................. 280/234 |
| 4,548,420 | 10/1985 | Patroni, Jr. ............................. 280/224 |
| 5,308,097 | 5/1994 | Bono et al. ............................ 280/234 |
| 5,833,256 | 11/1998 | Gilmore ................................. 280/224 |

FOREIGN PATENT DOCUMENTS

| | | |
|---|---|---|
| 930112 | 1/1948 | France .................................. 280/243 |
| 1138622A | 6/1957 | France . |
| 4000514 | 8/1991 | Germany .............................. 280/253 |

*Primary Examiner*—Anne Marie Boehler
*Attorney, Agent, or Firm*—Fasth Law Offices; Rolf Fasth

[57] ABSTRACT

The arm-driven vehicle has a drive mechanism comprising a driving member. A movable chain attachment is secured to the driving member and the chain attachment has spaced apart fork legs and a rod member extending therebetween. A movable arm has one end operatively attached to a fork leg that is attached to the arm-driven vehicle. A movable gear is in operative engagement with the movable arm via a pin. A chain is in operative engagement with the movable chain attachment via a bar segment. The bar segment is rotatably attached to the rod member of the fork legs so that the vehicle may be driven forwardly by moving the driving member back and forth.

11 Claims, 4 Drawing Sheets

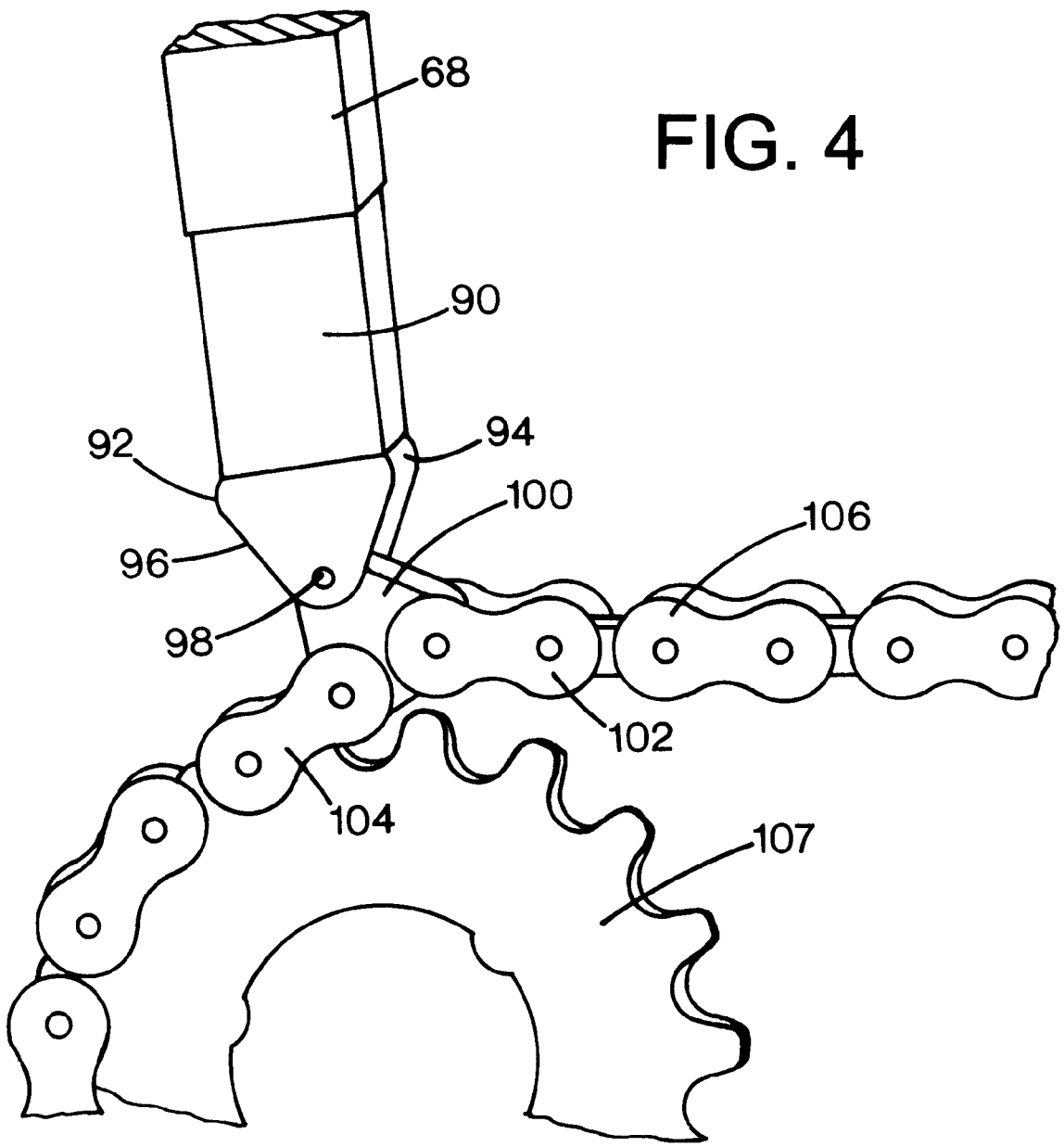

DRIVING DEVICE

PRIOR APPLICATION

This is a continuation-in-part application of PCT/SE96/00590 filed on May 3, 1996.

TECHNICAL FIELD

The present invention relates to an arm-driven vehicle having a driving mechanism that may be moved back and forth to drive the vehicle in a forward direction.

BACKGROUND AND SUMMARY OF THE INVENTION

Conventional bicycles that are powered by the legs of the operator have been available for several centuries. However, arm-driven non-motorized vehicles that can easily be maneuvered and powered by the arms have often been too difficult and cumbersome to use.

The vehicle of the present invention aims at providing an effective driving device, especially a gear device, for vehicles of the above-indicated type. A special purpose of the invention is to provide an arm-driven vehicle, which can be used both in connection with chain driving mechanisms that are movable sideways, and for chain driving mechanisms that are not.

More particularly, the present invention relates to a driving mechanism having a gear device that is adapted to arm-driven vehicles. It comprises a movable chain attachment provided on the driving member of the vehicle, and a movable gear that is provided at the front of a fork leg disposed at the front of the vehicle. The vehicle of the present invention may be driven forwardly by moving a handle back and forth that, in turn, moves a chain back and forth. The chain is operatively attached to a wheel that is caused to rotate.

BRIEF DESCRIPTION OF THE DRAWINGS

FIG. 4 is a detailed perspective view of a drive mechanism of the second embodiment of the present invention.

DETAILED DESCRIPTION OF THE INVENTION

Figure 1:
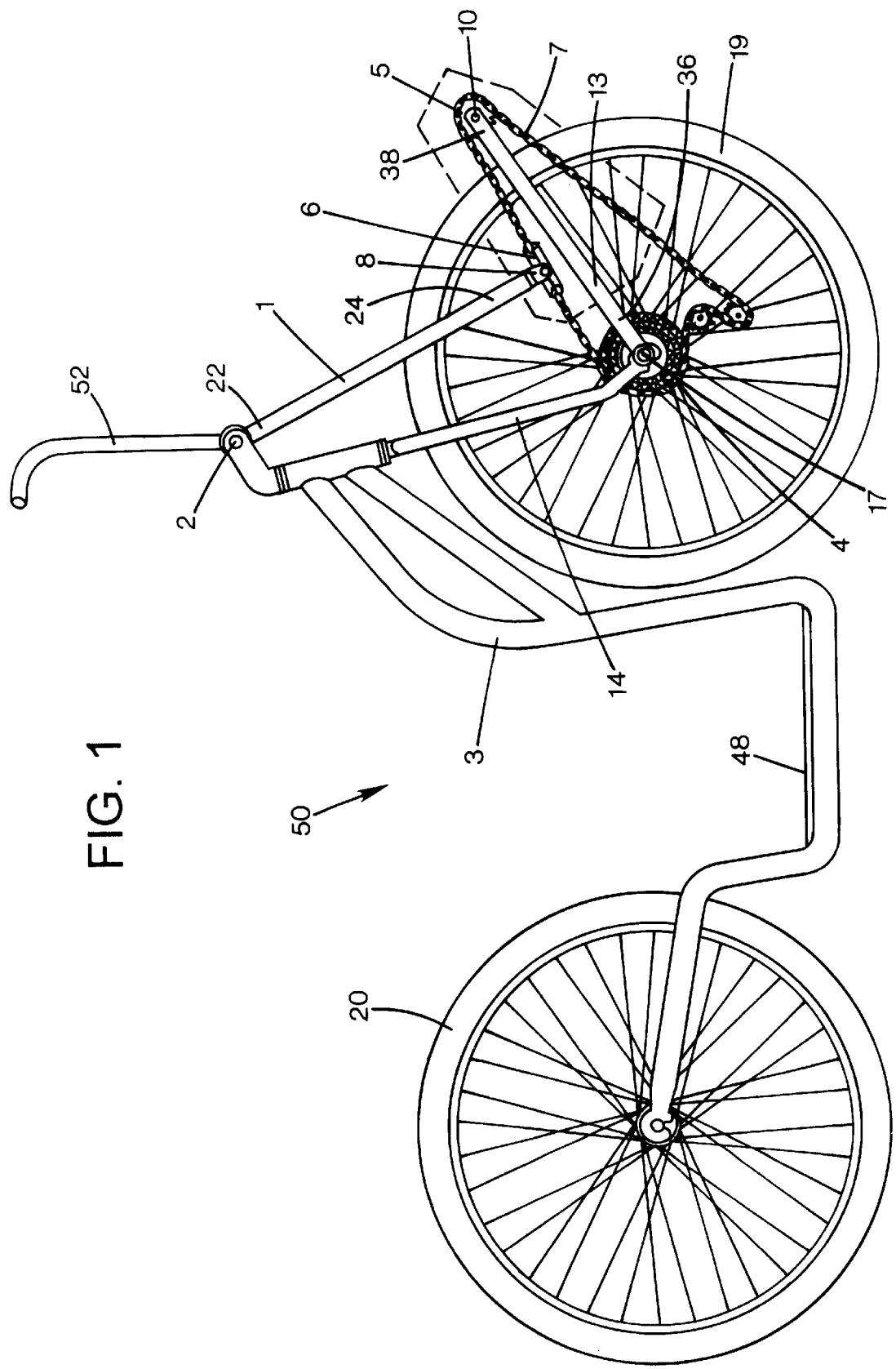
FIG. 1 is a side view of a first embodiment of the arm-driven vehicle of the present invention.

The invention will now be described in more detail with reference to a first preferred embodiment as shown in the enclosed FIGS. 1–2. The arm-driven vehicle 50 of the first embodiment of the present invention comprises an elongate driving member 1 having one end attached to a ball bearing 2 that, in turn, is attached to a frame 3 of the vehicle 50. The frame 3 may have a stand section 48 so that a user may stand on the stand section while moving a handle 52 back and forth to drive the vehicle in a forward direction, as explained in details below.

The frame 3 has a front wheel 19 and a rear wheel 20 that are both rotatably connected to the frame 3. In the first preferred embodiment of the present invention, the driving member 1 is movable back and forth so that an upper portion 22 of the driving member 1 may pivot about the ball bearing 2 to move a driving mechanism that rotates the wheel 19 to drive the vehicle 50 forwardly. The vehicle 50 has the steering handle 52 attached thereto that may be used not only to steer the vehicle 50 but also to drive or power the vehicle. The steering handle 52 is attached to the driving member 1 so that when the steering handle 52 is pulled backwardly toward the frame 3, the driving member 1 is pushed forwardly to drive vehicle 50 in a forward direction. The driving member 1 is preferably not movable in a sideways direction, as described in detail below.

Figure 2:
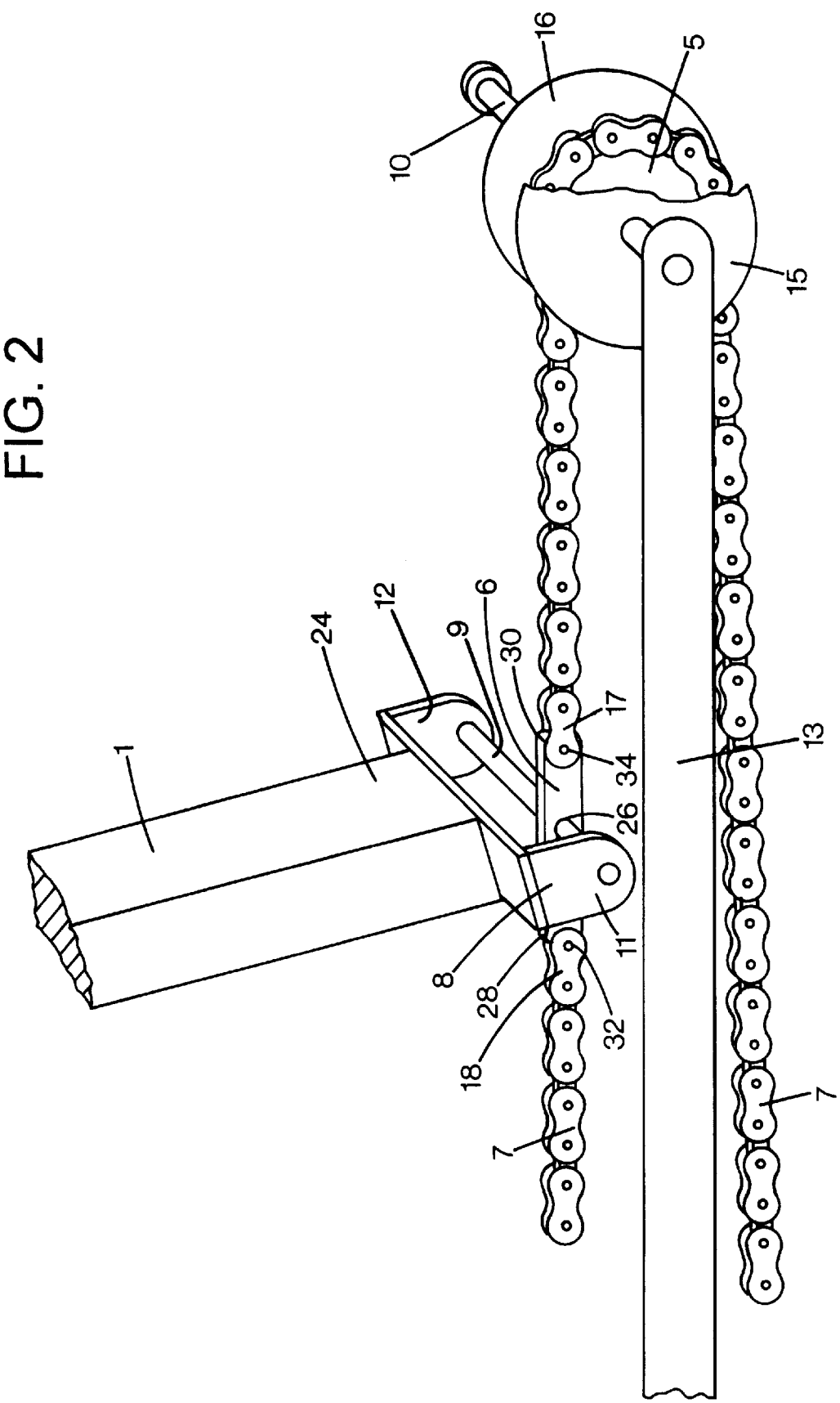
FIG. 2 is a detailed perspective view of a drive mechanism of the present invention.

A lower portion 24 of the driving member 1 has an attachment section 8, as best seen in FIG. 2. Fork members 11, 12 are attached to each end of the attachment section 8. The fork members are substantially parallel to one another and extend away from the ball bearing 2. A lateral rod member 9 extends between the fork members 11, 12 so that the rod member 9 is spaced apart from the attachment section 8. A bar segment 6 defines a central opening 26 that has the rod member 9 slidably inserted therein so that the bar segment 6 may slide sideways along and rotate about the rod member 9. The bar segment 6 has two opposite ends 28, 30 that are rotatably attached to end portions 32, 34, respectively, of an elongate chain 7.

The frame 3 has a downwardly extending fork 14 that is rotatably attached to an inner end 36 of an elongate movable arm 13. The movable arm 13 may move relative to the fork 14 when the vehicle 50 is in use. An outer end 38 of the movable arm 13 is attached to a pin 10 that protrudes in a direction that is substantially perpendicular to the movable arm 13. It is to be understood that the movable arm 13 may be non-rotatably secured to the fork 14. A movable gear 5 is both shiftably and rotatably attached to the movable arm 13 and may slide sideways on the pin 10 and rotate about the pin 10, as desired. A pair of protective discs 15, 16 are attached to the movable gear 5 and disposed on each side of the movable gear 5 so that the protective discs may move with the movable gear 5 on the pin 10. It is to be understood that the protective discs may have any suitable shape such as round, square or any other suitable shape. The protective discs prevent the chain 7 from disengaging or jumping off the movable gear 5. The protective discs also reduces the risk of injury to the user and others that may be close to the driving mechanism during the operation thereof. The movable gear 5 also functions without the protective discs 15, 16.

The gear assembly 4 has a plurality of cogs of different sizes and a shift mechanism so that the chain 7 can be moved from one cog to another cog to change the gear ratio of the gear assembly 4. The gear assembly 4 is in operative engagement with a hub 17 of the wheel 19 and the hub is constructed so that the gear assembly 4 drives the wheel 19 when the gear assembly 4 is moved in a clockwise direction by the chain 7. In this way, when the driving member 1 is moved forwardly toward the movable gear 5, the chain 7 is pulled forward also and the gear assembly 4 is turned clockwise to rotate the wheel 19. It is important to note that when the driving member 1 is moved backwardly, the free wheel of the gear assembly 4 permits the wheel 19 to continue rotating in a clockwise direction although the gear assembly 4 and the chain 7 move in a counter clockwise direction. In this way, the driving member 1, and thus the chain 7, are moved back and forth and the wheel 19 is driven forwardly every time the driving member 1 is shifted forwardly. When the chain 7 is moved from one cog to another cog of the gear assembly 7, it is not necessary to also shift the driving member 1 in a sideways direction. The driving member 1 is not permitted to move sideways, only back and forth. Instead, the bar segment 6 and the movable gear 5 are moved sideways to follow the sideways movement of the chain 7. In the preferred first embodiment, the gear assembly 4 has a first width and the attachment section 8 has a second width. The first width is substantially similar to the second width.

Figure 3:
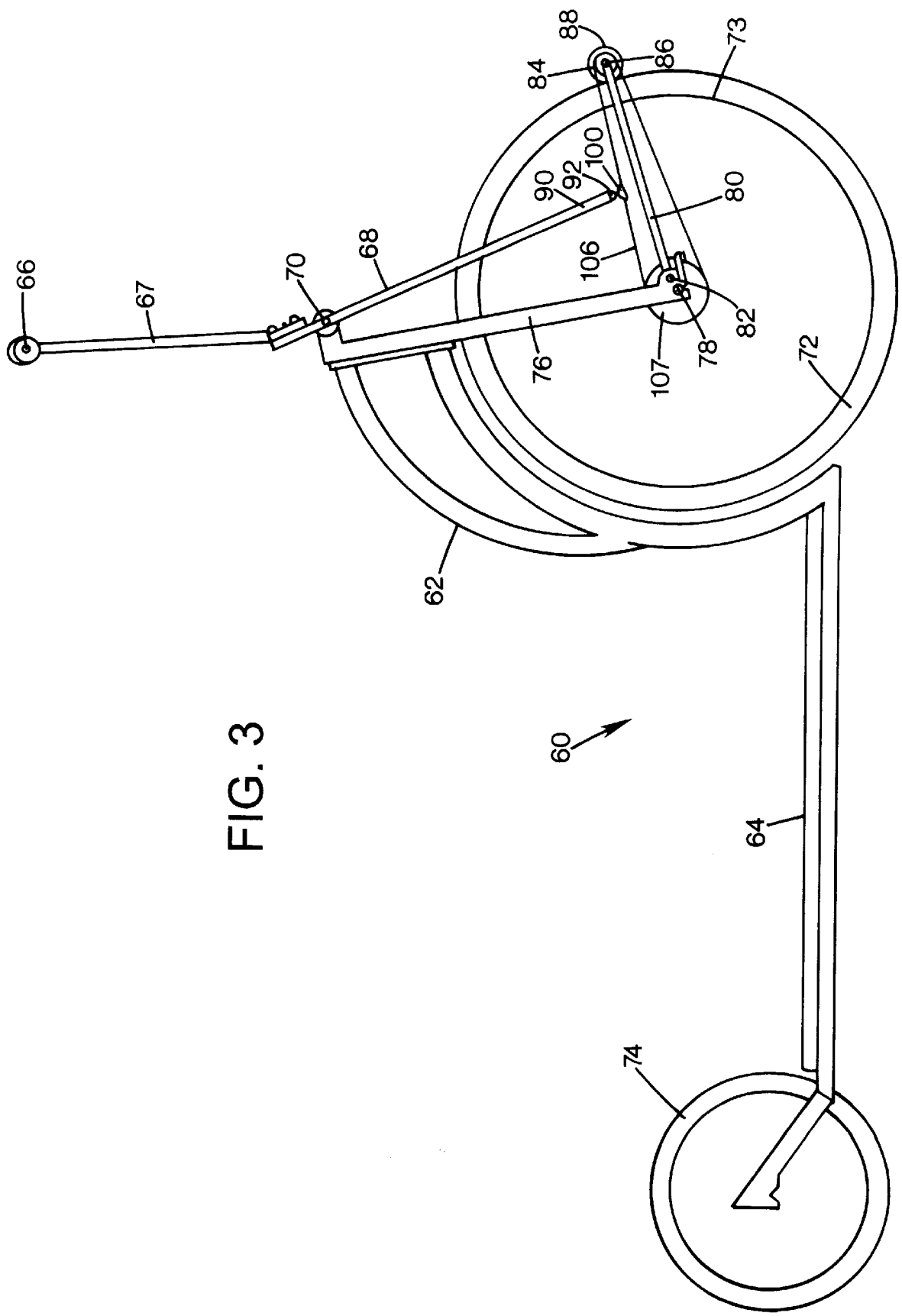
FIG. 3 is a side view of a second embodiment of the arm-driven vehicle of the present invention.

FIG. 3 is a second alternative embodiment of the arm-driven vehicle 60 of the present invention. The vehicle 60 has a frame 62 with a plate 64 that the user can stand on during the operation of the vehicle 60. A handle 66 is attached to a movable arm 68 that is rotatably attached to a pivot member 70. The handle 66 is movable back and forth via a rod member 67 about the pivot member 70. The handle 66 may also be used to the steer the vehicle 60. The vehicle 60 has a front wheel 72 and a back wheel 74. The front wheel 72 has an outer rim 73. A fork member 76 extends between the frame 62 and a central hub 78 of the front wheel 72. A movable arm 80 is rotatably attached to a pivot pin 82 that is attached to a bottom portion of the fork member 76. A front end 84 of the movable arm 80 is attached to a pivot arm 86 that has a gear 88 rotatably attached to the pivot arm 86.

A lower portion 90 of the movable arm 68 has an attachment mechanism 92. The attachment mechanism may include two substantially parallel extensions 94, 96 (best seen in FIG. 4) that each have an opening defined therein for receiving a pivot member 98. A chain connector 100 has one end that is pivotably attached to the pivot member 98. An opposite end of the chain connector is pivotally connected to chain links 102, 104 of a chain 106. A gear assembly 107 is in operative engagement with the hub 78. The gear assembly 107 is a closed gearing system so that the chain 106 does not move sideways when a first gear is changed to a second gear in the gear assembly 107. In the preferred second embodiment, the gear assembly 107 includes an external cog that is in operative engagement with an internal gear shifting mechanism. This is a significant difference compared to the first embodiment shown in FIG. 1 because there is no need for the movable gear 88 nor the chain connector 100 to move sideways.

While the present invention has been described in accordance with preferred compositions and embodiments, it is to be understood that certain substitutions and alterations may be made thereto without departing from the spirit and scope of the following claims.

I claim:

1. A drive mechanism for an arm-driven vehicle, comprising:

a driving member;

a movable chain attachment that is secured to the driving member, the chain attachment having spaced apart fork legs and a rod member extending therebetween;

a movable arm having one end for operative attachment to a vehicle fork leg;

a movable gear in operative engagement with the movable arm via a pin;

a gear assembly;

a chain in operative engagement with the movable chain attachment, the movable gear and the gear assembly;

a protective disc disposed on each side of the movable gear; and the movable chain attachment comprising a bar segment that is movable sideways on the rod member and the movable gear being movable sideways on the pin so that both the bar segment and the movable gear are movable substantially the same distance when the chain is shifted from a first gear on the gear assembly to a second gear on the gear assembly.

2. The drive mechanism according to claim 1 wherein bar segment has a first opening, a second opening and a third opening defined therein, the rod member being inserted into the second opening and end portions of the chain being inserted into the first and third openings.

3. The drive mechanism according to claim 2 wherein the end portions are rotatably attached to the bar segment.

4. A drive mechanism for an arm-driven vehicle, comprising:

a driving member;

a movable chain attachment that is secured to the driving member, the chain attachment having spaced apart fork legs and a rod member extending therebetween;

a movable arm having one end for operative attachment to a vehicle fork leg;

a movable gear in operative engagement with the movable arm via a pin;

a gear assembly;

a chain in operative engagement with the movable chain attachment, the movable gear and the gear assembly;

a protective disc disposed on each side of the movable gear; and the gear assembly having a first width and the fork legs of the chain attachment being spaced apart a first distance from one another, the first width being substantially similar to the first distance.

5. The drive mechanism according to claim 4 wherein the protective disc comprises two disc members disposed on each side of the movable gear, the disc members being secured to the movable gear and slidably attached to the pin so that the disc members are permitted to follow any sideways movement and rotational movement of the movable gear.

6. The drive mechanism according to claim 4 wherein the chain attachment has a second width, the first width being substantially similar to the second width.

7. An arm-driven vehicle, comprising:

a frame;

a fork attached to the frame;

a first wheel having a hub that is rotatably attached to the fork;

a driving member pivotally attached to the frame;

a movable chain attachment secured to the driving member;

a movable arm having one end operatively attached to the fork;

a movable gear in operative engagement with the movable arm;

a gear assembly in operative engagement with the hub of the first wheel for driving the arm-driven vehicle;

a chain in operative engagement with the movable chain attachment, the movable gear and the gear assembly; and the movable chain attachment being attached to the chain at a point that is disposed between the movable gear and the gear assembly.

8. The arm-driven vehicle according to claim 7 wherein the movable arm is substantially perpendicular to the fork and extends outwardly and away from the gear assembly.

9. The arm-driven vehicle according to claim 7 wherein the movable arm and the driving member are substantially straight.

10. The arm-driven vehicle according to claim 7 wherein the first wheel has an outer rim that is disposed between the gear assembly and the movable gear.

11. The arm-driven vehicle according to claim 7 wherein the driving member is attached to the chain so that the chain drives the first wheel of the vehicle in a forward direction when the driving member is moved toward the movable gear.

* * * * *